Figure 1:
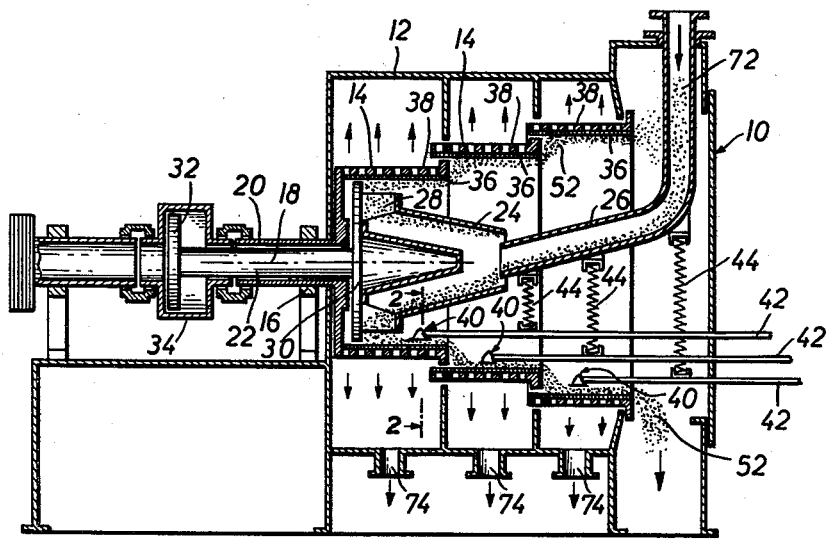

Oct. 29, 1963

W. SCHEEL 3,108,951

FILTER CAKE WASHING DEVICE

Filed Sept. 28, 1960

2 Sheets-Sheet 1

INVENTOR
WOLFGANG SCHEEL
BY
Raymond W Colton

Oct. 29, 1963  W. SCHEEL  3,108,951
FILTER CAKE WASHING DEVICE
Filed Sept. 28, 1960  2 Sheets-Sheet 2

INVENTOR
WOLFGANG SCHEEL
BY
Raymond Wootton

United States Patent Office 3,108,951
Patented Oct. 29, 1963

3,108,951
FILTER CAKE WASHING DEVICE
Wolfgang Scheel, Rheinberg, Rhineland, Germany, assignor to Deutsche Solvay-Werke Gesellschaft m.b.H., Solingen-Ohligs, Germany, a corporation of Germany
Filed Sept. 28, 1960, Ser. No. 58,941
Claims priority, application Germany Oct. 30, 1959
9 Claims. (Cl. 210—199)

This invention relates to a filter cake washing device for a centrifuge, particularly applicable to centrifuges of the so-called "thrust" type.

Whereas it has been proposed previously to introduce water into a centrifuge for washing the filter cake by means of various types of nozzles, the water requirements have been excessive, and in installations where successive washing and drying zones are involved, the prior arrangements, because of air turbulence, have introduced water at the drying zones where it is undesirable, thereby increasing the residual moisture contained in the extracted material.

Another arrangement previously proposed has employed rotating distributors of conical configuration from which the water is delivered radially to impinge upon the filter cake at approximately the same peripheral velocity as the filter cake. Under such conditions, where the maximum diameter of the funnel approximates the inner diameter of the filter cake, splashing is avoided to a reasonable degree. Such arrangements are objectionable however, because the washing zone achieved is relatively small in an axial direction. Consequently, in conjunction with centrifuges of the thrust type where the filter cake is progressively ejected, the washing lacks uniformity and is inadequate. While the filter cake is being moved axially in such centrifuges, it receives an insufficient quantity of water to effect the required washing and while the filter cake is receiving no axial movement, the quantity of washing water under such circumstances is excessive. In an effort to remedy this condition, attempts have been made in the past to interrupt the stream of water for the periods during which the filter cake is partaking of no axial movement.

The problems inherent to such prior art devices have been solved by the present invention in a relatively simple but highly effective manner. According to this invention the washing device produces an elongated water jet whose larger dimension lies substantially parallel to the axis of the centrifuge rotor, the washing device being substantially in contact with the inner surface of the filter cake into which therefore the jet is immediately introduced. This larger dimension of the jet preferably corresponds substantially to the axial movement imparted to the filter cake by the pusher or thrust element of a thrust centrifuge for which the washing device is intended. This arrangement assures a highly uniform washing of the filter cake with a minimum consumption of water, since said arrangement prevents any substantial spreading of the jet between the washing device and filter cake undergoing treatment. This desirable effect is further assured by imparting to the washing water a direction having a component corresponding to the direction of rotation of the filter cake itself, thereby reducing the shock that would otherwise occur at the point of contact between the jet and filter cake.

The arrangement contemplated by this invention prevents the introduction of air at the area in which the washing water is introduced into the filter cake which also improves the results achieved.

It is accordingly, among the objects of this invention to provide a filter cake washing device for a centrifuge including a stator, a rotor having an axis and an inner wall for the collection of filter cake, and a bearing supporting the rotor relative to the stator, comprising a nozzle member providing an elongated discharge port proximate to the inner wall for directing fluid to the filter cake, the port having a longer dimension lying substantially parallel to the axis. In centrifuges including a pusher element movable parallel to the axis for ejecting filter cake from the rotor, the longer dimension of the port corresponds to the length or to a whole number multiple of the length of stroke of the pusher element. The nozzle member preferably provides a convex surface proximate to and substantially conforming to the curvature of the inner wall of the rotor so as to conform to the adjacent surface of the filter cake as it builds up on the inner wall of the rotor. The nozzle member is preferably provided with biasing means, such as a spring, to press it gently towards the filter cake and the nozzle member preferably provides a fluid passage communicating with the discharge port and inclined towards the inner wall of the rotor in the direction of rotation of the rotor.

The nozzle member preferably has convergent leading and trailing ends and includes a fluid chamber remote from the inner wall in communication with a source of washing liquid. The leading end of the nozzle member is preferably inclined away from the inner wall. It is also contemplated that a plurality of such nozzle members be employed for being effective at different parts of the inner wall of the rotor of a centrifuge. In such cases, the nozzle members can be connected to separate sources of fluid of different types, if desired.

The present invention has produced exceedingly favorable results in centrifuging the crude bicarbonates in the manufacture of ammonia soda, but it is highly useful in conjunction with a wide variety of materials having other compositions.

Figure 2:
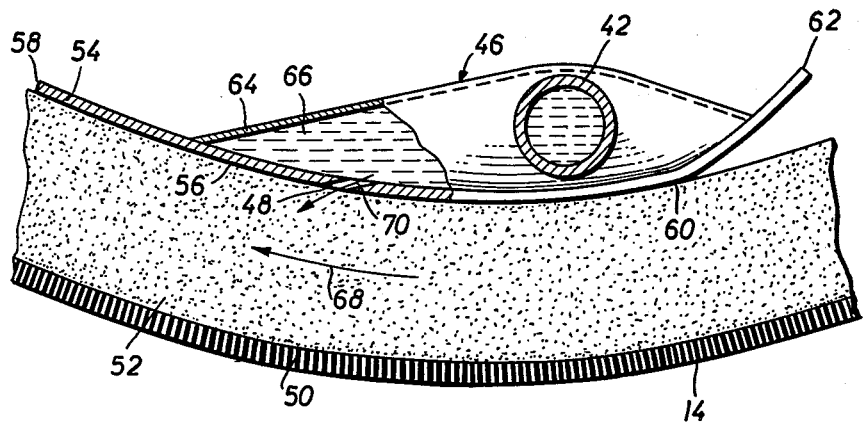
Figure 3:
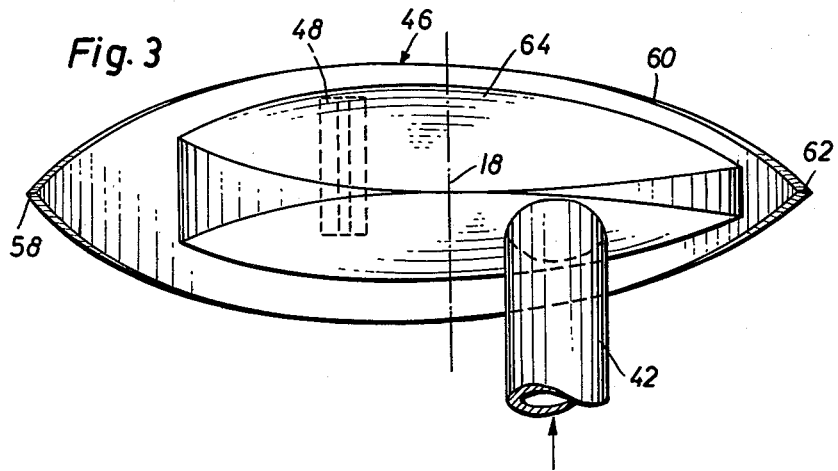

A more complete understanding of the invention will follow from a description of the accompanying drawings wherein:

FIG. 1 is a somewhat schematic sectional elevation of a centrifuge embodying the present invention, FIG. 2 is a section taken along line 2—2 of FIG. 1 on an enlarged scale, and FIG. 3 is a plan view of the nozzle member shown in FIG. 2.

The centrifuge 10 depicted in FIG. 1 comprises a stator 12 and a rotor 14 supported by a bearing 16 for rotation about an axis 18. Within the hollow shaft 20 of the rotor 14, a solid shaft 22 is provided, on the right end of which a distributor 24 is carried to receive the material to be treated from a supply conduit 26. The distributor member 24 has a relatively reduced opening to receive material from the supply pipe 26, from which it diverges in frusto conical fashion to communicate with radially disposed delivery passages 28 adjacent its base 30. The other end of the shaft 22 carries a piston 32 received within a cylinder 34 by means of which oscillating axial movement will be imparted to the shaft 22, its base or pusher member 30 and the distributor member 24. Not especially depicted in FIG. 1, there are means to impart said oscillating axial movement also to the middle step of the rotor 14 forming part of the centrifuge shown in this figure. This assures a periodic movement of the filter cake deposited on the inner wall of the rotor member 14 from the pusher member 30 towards the exit 52.

The inner wall of the rotor 14 is depicted as having steps of progressively larger diameters as viewed from left to right. The inner wall is defined by screens 36 received within the stepped perforated portions 38 to support the filter cake as it is formed under operating conditions.

Each stepped portion of the rotor 14 is depicted in FIG.

1 as provided with at least one washing device 40 embodying the present invention.

Each such washing device is supported at the end of a liquid supply pipe 42 and biased towards the inner wall of the rotor by means of a spring 44 which will be suitably damped. These springs may bear against any relatively fixed part of the equipment, the supply pipe 26 having been selected for purposes of illustration. As best shown in FIGS. 2 and 3, the washing device includes a nozzle member 46 containing an elongated discharge port 48 disposed proximate to the perforated inner wall 50 of the rotor 14. Thus as the filter cake 52 builds up, under the influence of the biasing spring 44, the discharge port 48 will assume a position substantially in contact with the filter cake so as to exclude air from this region. The nozzle member 46 has a sole plate 54, the major portion of whose lower surface 56 is convex and parallel to the inner wall 50 of the rotor. This configuration extends from an intermediate portion 60 to the trailing end 58 while the fore part of the sole plate 54 forming the leading end 62 inclines away—similar to the top of a ski—from the inner wall 50 towards the axis 18 of the rotor. As shown in FIG. 3, the nozzle member converges, in plan, towards its leading end 62 and its trailing end 58 in a manner suggestive of a canoe.

An upper plate 64 secured to the sole plate 54 defines a chamber 66 from which the desired fluid, such as water, is delivered to the filter cake 52. The direction of rotation of the rotor and filter cake is depicted by the arrow 68 as being clockwise in FIG. 2 and in order to impart a corresponding component of motion to the jet of liquid impinging on the filter cake from the discharge port 48, the passage 70 extending from the concave upper surface of the sole plate 54 to the discharge port 48 is inclined from right to left as clearly shown in FIG. 2. This inclination of the passage has contributed to the highly desirable results achieved with this equipment.

As best shown in FIG. 3, the discharge port 48 is elongated with its longer dimension lying substantially parallel to the axis 18 of the rotor. This longer dimension is preferably equal to or a whole number multiple of the length of stroke imparted to the base or pusher plate 30 of the distributor 24. Inasmuch as this distributor is reciprocated periodically, with these dimensions, the quantity of water supplied to each portion of the filter cake will be substantially the same.

The smaller dimension of the discharge port is determined by the quantity of washing water required. In a number of installations it has assumed a dimension of from 2 to 3 millimeters. Whereas water is preferred as the washing fluid for many of the uses contemplated, other fluids can be employed and where more than one washing device is used, different fluids or liquids can be introduced if desired.

The material 72 to be treated is introduced through the pipe 26 by gravity or under pressure from which it enters the distributor 24 and delivered by centrifugal force through the radial passages 28 to the rotor 14 through whose perforated walls the material to be removed passes to and through suitable delivery pipes 74. The filter cake builds up on the inner walls 50 of the rotor 14, along which it is moved axially by periodic strokes imparted by the piston 32. In this way all parts of the filter cake just beneath the washing devices are washed by the fluid delivered from the discharge port or ports 48 in a manner already described. Whereas the frequency of the movements imparted to the oscillating members may vary over a wide range, highly satisfactory results have been achieved with up to 45 such reciprocations per minute.

Whereas only one specific form of the invention has been described with reference to the accompanying drawings, such variations as will occur to those skilled in the art are contemplated within the scope of the appended claims.

I claim:

1. A filter cake washing device for a centrifuge including a stator, a rotor having an axis and an inner wall for the collection of filter cake, means for distributing filter cake on said inner wall, and a bearing supporting said rotor relative to said stator, comprising a nozzle member radially movable relative to said rotor for directing fluid to filter cake on said inner wall, said nozzle member having a convex surface substantially conforming with the curvature of said inner wall and containing an elongated discharge port proximate to said inner wall, means resiliently biasing said nozzle member towards said inner wall to maintain said discharge port in contact with filter cake carried by said inner wall, thereby preventing substantial spreading of fluid and preventing introduction of air in the area in which fluid is introduced to the filter cake, said port having a longer dimension substantially parallel to said axis, and pusher means movable relative to said rotor for imparting sliding movement of filter cake relative to said nozzle.

2. A device according to claim 1 wherein said pusher means is movable parallel to said axis for ejecting filter cake from said rotor and the longer dimension of said port corresponds to a whole number multiple of the length of stroke of said elements.

3. A device according to claim 1 wherein said nozzle member provides a fluid passage communicating with said discharge port and inclined towards said wall in the direction of rotation of said rotor.

4. A device according to claim 3, wherein by said fluid passage to the jet of washing liquids is imparted a velocity with a component in the direction of rotation of the filter cake thereby reducing the shock that would otherwise occur at the point of contact between the jet of liquid and said filter cake.

5. A device according to claim 1 wherein said nozzle member includes a fluid chamber remote from said inner wall.

6. A device according to claim 1 including a plurality of nozzle members each providing an elongated discharge port proximate to portions of the inner wall of said rotor for directing fluid to the filter cake.

7. A device according to claim 6, wherein each of said nozzle members is connected to a separate source of fluid.

8. A device according to claim 1 wherein said surface of the nozzle member has a convergent leading end inclined away from the inner wall of the rotor, while the major part of said surface is parallel to said inner wall.

9. A device according to claim 1 wherein said nozzle member is connected to a source of washing liquid for supplying said discharge port.

References Cited in the file of this patent

UNITED STATES PATENTS

| | | |
|---|---|---|
| 1,627,882 | Berry | May 10, 1927 |
| 1,717,604 | Haug et al. | June 18, 1929 |
| 2,469,825 | Hornstein | May 10, 1949 |
| 2,755,934 | Ruegg | July 24, 1956 |
| 2,828,021 | Ruegg | Mar. 25, 1958 |
| 3,029,948 | McKay | Apr. 17, 1962 |

FOREIGN PATENTS

| | | |
|---|---|---|
| 143,756 | Germany | Apr. 30, 1902 |